United States Patent [19]

Heinz et al.

[11] Patent Number: 4,985,534

[45] Date of Patent: Jan. 15, 1991

[54] POLYETHERAMIDE HOTMELT-ADHESIVES

[75] Inventors: Hans-Detlef Heinz, Krefeld; Eduard Hänsel, Wuppertal-Elberfeld; Rolf-Volker Meyer, Krefeld; Günter Arend, Dormagen, all of Fed. Rep. of Germany

[73] Assignee: Bayer Aktiengesellschaft, Leverkusen, Fed. Rep. of Germany

[21] Appl. No.: 474,480

[22] Filed: Feb. 2, 1990

[30] Foreign Application Priority Data

Feb. 11, 1989 [DE] Fed. Rep. of Germany ....... 3904155
Mar. 21, 1989 [DE] Fed. Rep. of Germany ....... 3909215

[51] Int. Cl.$^5$ ............................................. C08G 63/02

[52] U.S. Cl. .................................. 528/272; 528/288; 528/291; 528/292; 528/295.3; 528/295.5; 528/297; 528/301; 528/302; 528/308; 528/308.6; 528/324; 528/325; 528/335

[58] Field of Search ............... 528/272, 288, 291, 292, 528/295.3, 295.5, 297, 301, 302, 308, 308.6, 324, 325, 335

[56] References Cited

U.S. PATENT DOCUMENTS 4,238,582 12/1980 Deleens et al. .................... 525/430

Primary Examiner—Morton Foelak
Assistant Examiner—S. A. Acquah
Attorney, Agent, or Firm—Connolly and Hutz

[57] ABSTRACT

This invention relates to modified polyetheramide hotmelt adhesives showing reduced melt viscosity and, optionally, better adhesive properties and to their use as ingredients for hotmelt adhesives.

14 Claims, No Drawings

POLYETHERAMIDE HOTMELT-ADHESIVES

This invention relates to modified polyetheramide hotmelt adhesives showing reduced melt viscosity and, optionally, better adhesive properties and to their use as ingredients for hotmelt adhesives.

Bonding of parts by adhesion is generally carried out with solvent-based adhesives or with so-called polymerization adhesives. In both cases, a certain "open" time is necessary for evaporation of the solvent or for polymerization until the bond has acquired its full strength.

Modern, time-saving processes require short adhesive setting times which, in many cases, can be achieved by the use of hotmelt adhesives.

Suitable hotmelts are, for example, thermoplastics of various kinds, for example ethylene vinyl acetate copolymers containing approximately 30% by weight vinyl acetate, polyesters and also copolyamides which are selected according to the desired application and which are applied in the form of powders, pastes or melts to the articles and materials to be bonded.

Powder-form hotmelts are preferably used for the bonding of textiles, the bond being established either by hot pressing or by ironing.

In the shoe industry, the hotmelts used are applied in the form of melts, particularly for the bonding of toes and counters, the parts being briefly subjected to pressure during cooling, whereby the adhesive has to establish an immediate, permanent bond.

Hotmelts based on thermoplastic polyesters and polyamide resins are preferably used for this particular application.

The polyester-based products which are suitable in principle are generally attended by the disadvantage that they have to be applied at temperatures above 200° C. and, in addition, establish a relatively inelastic bond which can break very easily under flexural stress.

Polyamide-based hotmelts are divided generally into two major classes, namely the products based on dimeric fatty acids and the products free from dimeric fatty acids.

The polyamides based on dimerized fatty acids normally have good properties only when the dimer content is greater than 90% and, more especially, greater than 95% and when the impurities in the form of monomer and trimer fatty acids are present in defined quantities (OS No. 1 520 933; DE-AS No. 1 594 008).

Thus, an excessive content of trimer fatty acids leads readily to an excessive melt viscosity or even to gelation, while an excessive content of monomer fatty acids leads to products which are brittle and inflexible.

Another disadvantage of these polyamide resins lies in the fact that they tend to cause an increase in viscosity and subsequent darkening on contact with air at the necessary application temperatures of up to 200° C. (Coating, 8, 218, 1971).

Although products based on hydrogenated dimer fatty acids do not have this disadvantage, the hydrogenation is an extra step in addition to the enrichment of the dimer, so that hydrogenated dimer fatty acids, are comparatively expensive.

In principle, products based on lactams afford advantages in this regard in that they are obtainable on an industrial scale (for example caprolactam) and do not contain any double bonds. The disadvantage is that products based on caprolactam have high melt viscosities and long melting times so that, despite high bond strengths, application is generally very difficult.

DE-OS No. 2 542 467 describes polyesteramides of lactams, primary diamines, polyhydride $C_{2-12}$ alcohols and dicarboxylic acids which may be used as hotmelts, but which generally show too high softening points for practicable application from the melt and are also not sufficiently elastic.

In general, only products produced from lauric lactam as the principal component, in conjunction with dodecane dicarboxylic acid or dodecanediol, satisfy the relatively stringent requirements in regard to elasticity and application. The disadvantage of polyesteramides, apart from the fact that some of the components are difficult to obtain, lies in particular in the two-stage production process, of which the first step has to be carried out under pressure and the second step in vacuo.

DDR-PS 87 888 describes polyesteramides produced from caprolactam, $C_{6-12}$ dicarboxylic acids and certain oligoether alcohols as migration-resistant plasticizers for polyamides. However, these generally paste-form products are clearly unsuitable as hotmelts.

EP No. 0 017 112 describes polyether ester amides containing caprolactam as the principal component which, although showing good adhesive properties, also show high melt viscosities, resulting in application disadvantages.

Although, basically, a low melt viscosity, high strength and high heat resistance represent conflicting requirements, a simple possibility of significantly reducing the melt viscosities of caprolactam-based hotmelts, without affecting their favorable adhesive properties, would be of considerable industrial interest because a whole category of high-strength hotmelts could then be more widely used.

It has now surprisingly been found that these basically conflicting requirements can be easily satisfied for special polyetheramide hotmelts by adding chain terminators having certain structural features to the starting materials, followed by polycondensation in the usual way.

It is of course known that the molecular weights of polycondensates can be controlled by non-equivalence of the functional groups or by using monofunctional compounds. However, it was surprising to find that, for a given molar quantity of the monofunctional chain terminator, the melt viscosity depends to a large extent on the nature of the chain terminator.

This discovery is all the more surprising insofar as the nature of the terminal group is not normally important in polyamides on account of its minimal concentration in the polymer chains.

It was also surprisingly to find that not only can melt viscosity be distinctly reduced by this measure for substantially the same molecular weight in relation for conventional chain terminators, but adhesive properties such as, for example, tensile strength or setting behavior, can also be improved.

Accordingly, the present invention relates to polyetheramide (PEA) hotmelts in which special polyether diols and at least 40% by weight caprolactam (ε-aminocaproic acid) and other polyamide-forming components are incorporated, characterized in that chain terminators corresponding to general formula (I)

$$R-Y \tag{I}$$

in which

R is an optionally branched, saturated or unsaturated, optionally substituted alkyl radical having a length of from about 12 to about 40 C atoms, and Y is a group reactive to lactams and/or carboxylic acids and/or alcohols and/or optionally amines, are used in the production process in quantities of from 0.1 to 4.0 mol-%, based on the total number of mols of polyether-forming components.

The present invention also relates to the use of the polyetheramides according to the invention, optionally in combination with other substances, as hotmelts and as additives for thermoplastics.

Examples of the group Y in formula (I) are the groups (II) t (III)

—NH$_2$      (II)

—COOH      (III)

which, at the same time, also represent the preferred groups Y. The group (III) is particularly preferred.

Examples of specific compounds corresponding to formula (I) are stearylamine, stearic acid, behenylamine, behenic acid, hexadecylamine, hexadecanoic acid, hexacosanoic acid and octacosanoic acid.

Preferred compounds corresponding to formula (I) contain saturated alkyl radicals with approximately 16 to approximately 35 C atoms.

Particularly preferred compounds corresponding to formula (I) are stearic acid, stearylamine, behenic acid, behenylamine, hexadecylamine and hexadecanoic acid.

The compounds corresponding to formula (I) may be added individually or in admixture. They are present in the reaction mixture in a quantity of from 0.1 to 4.0 mol-%, preferably in a quantity of from 0.2 to 3.5 mol/% and more preferably in a quantity of from 0.5 to 3.0 mol-%, based on the total number of mols of polyether-forming components.

The chain terminators corresponding to formula (I) are compounds known in principle or may be obtained in principle by known processes.

The polyetheramides according to the invention are prepared by polycondensation of reaction mixtures which, in addition to the chain terminators R—Y (I), contain (1) 40 to 75% by weight aminocaproic acid units derived, for example, from caprolactam and/or aminocaproic acid, (2) 25 to 60% by weight of a mixture in the stated equivalent ratios of
  (a) 0.95 to 1.05 equivalents and preferably 1 equivalent of one or more aliphatic and/or aromatic C$_4$-C$_{38}$ dicarboxylic acids, for example adipic acid, azelaic acid, isophthalic acid, terephthalic acid, sebacic acid and dimerized fatty acids (according to the invention, preferred polyetheramides do not contain any dimer fatty acids),
  (b) 0.2 to 0.9 equivalents of one or more aliphatic and/or cycloaliphatic C$_{6-25}$ diamines, preferably for example hexamethylenediamine, trimethyl hexamethylenediamines, isophoronediamine and binuclear diamines corresponding to formula (V)

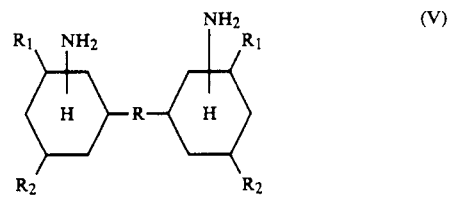

in which R is, for example, C$_{1-10}$ alkylene or alkylidene radical and preferably a —CH$_2$— radical or a

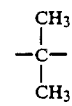

radical and R$_1$ and R$_2$ may be the same or different and represent H or C$_{1-3}$ alkyl, for example 4,4'-diamino-3,3'-dimethyl dicyclohexyl methane, 4,4'-diamino-3,3',5,5'-tetramethyl dicyclohexyl methane, 4,4'-diaminodicyclohexyl propane and, preferably, 4,4'-diaminodicyclohexyl methane and diaminodicyclohexyl methane isomer mixtures of which at least 75% consist of the 4,4'-isomer,
  (c) 0.1 to 0.8 equivalents of one or more polyoxyalkylene diols, for example polyoxyethylene diols, polyoxypropylene diols or ethylene oxide/propylene oxide copolymer diols having molecular weights ($\overline{M}_n$) in the range from 200 to 1,000 g mol$^{-1}$, the terminal OH groups being completely or partly replaceable by terminal primary amine groups, and optionally (3) 0 to 15% by weight, based on the sum of (1)+(2), of lactams and/or aminocarboxylic acids different from caprolactam or aminocaproic acid, for example lauric lactam and aminoundecanoic acid.

Where dimer fatty acids according to (2a) are used, they should contain at least 95% by weight dimeric fatty acids. Dimer fatty acids according to (2a) and also aminoundecanoic acid or lauric lactam according to (2c) should be present in the polyetheramides (PEA) in a maximum quantity of 15% by weight. However, preferred polyetheramides contain neither dimer fatty acids nor aminoundecanoic acid nor lauric lactam.

Preferred polyetheramides are prepared from (1) 40 to 75% by weight caprolactam (+ optionally small quantities of aminocaproic acid)

(2) 25 to 60% by weight of a mixture of (a) to (c) in the stated equivalent ratios of
  (a) 0.95 to 1.05 equivalents and preferably 1 equivalent of a dicarboxylic acid selected from adipic acid and/or sebacic acid and/or isophthalic acid and/or terephthalic acid,
  (b) 0.5 to 0.9 equivalents of hexamethylenediamine and/or 4,4'-diaminodicyclohexyl methane (or of the isomer mixtures characterized above which may also contain up to 10% by weight more highly condensed components, for example triamines),
  (c) 0.1 to 0.5 equivalents of polyoxyalkylene diols having a molecular weight ($\overline{M}_n$) in the range from 300 to 600 g mol$^{-1}$, where the sum of equivalents (b+c)=1, (3) in the absence of dimer fatty acids, lauric lactam or aminoundecanoic acid, (4) using 0.2 to 3.5 mol-%, based on the total number of mols of polyetheramide-forming components of (1) to (3) used, of monoamines and/or monocarboxylic acids R—Y as chain terminators with a carbon chain R of 16 to 35 C atoms corresponding to formula (I).

Accordingly, the preferred polyether amides are, more exactly, polyesteramides although they are referred to in short as polyetheramides (PEA) in the present specification.

The products according to the invention have acid values in the range from 4 to 20 and preferably in the range from 4 to 14 and relative viscosities (1% by weight solution in m-cresol at 25° C.) of from 1.3 to 2.5 and preferably from 1.3 to 2.0. Their softening point (ring and ball) is generally in the range from 100° to 200° C. and preferably in the range from 135° to 190° C., while their melt viscosity at 200° C. is in the range from 0.5 to 100 Pa.s and preferably in the range from 1 to 50 Pa.s.

The present invention also relates to the polyetheramides obtained by the process according to the invention. The products according to the invention may also be used as adhesive mixtures together with other adhesive components, auxiliaries or even as an additive for thermoplastics.

The polyetheramides according to the invention may be prepared by methods known per se, optionally using typical catalysts, for example in autoclaves or tanks, or even continuously by condensation of the starting components. To this end, the monomer mixture is gradually heated, optionally under pressure, to a temperature of from 200° to 300° C. and preferably to a temperature of from 220° to 280° C. and polycondensed under nitrogen at that temperature until the desired molecular weight is reached. The progress of the reaction may readily be followed by determination of the acid value. On completion of the polycondensation reaction, the polymer melt is cooled to between 120° to 220° C., depending on the composition of the product, extruded from the autoclave by nitrogen excess pressure either in the form of a ribbon or in the form of a strand and suitably size-reduced, for example chopped, cut up or granulated.

The product obtained may be freed from, for example, unreacted caprolactam by extraction with water without adversely affecting the good elasticity of the polyetheramides. In addition, the products obtainable by extraction of the monomeric caprolactam are distinguished by their highly stable viscosity and generally by a further reduction in setting time.

The polyetheramides prepared with the chain terminators to be used in accordance with the invention, not only have a distinctly reduced melt viscosity, but often also show improved values, for example for tensile strength or setting time (cf. Comparison Examples), in relation to products prepared with the same molar quantities of typical chain terminators such as, for example, benzoic acid.

Accordingly, they may have the further advantage over types regulated, for example with benzoic acid, that the equilibrium-induced content of caprolactam and oligomer and also other substances need not be extracted without any increase in setting time.

Accordingly, through elimination of the extraction step in these cases, the polyetheramides according to the invention, may also be produced more favourably in terms of cost than products prepared with typical chain terminators.

The products according to the invention may contain further additives, optionally in the form of concentrates in polymers, such as for example pigments, flatting agents, nucleating additives, stabilizers, elastomer modifiers and also flow aids. Depending on their type, these additives may be incorporated before, during or after the polycondensation.

The polyetheramides, according to the invention, may also be used as additives for other thermoplastics. However, they are particularly suitable as high-quality ingredients of hotmelt adhesives, preferably for the shoe industry. Where they are used as hotmelts, they should preferably have melt viscosities below 25 Pa.s at 220° C.

The invention is illustrated by the following Examples in which parts and percentages are by weight, unless otherwise indicated.

COMPARISON EXAMPLE 1

A mixture of 900 g caprolactam, 228 g 4,4'-diaminodicyclohexyl methane, 260 g polyoxyethylene glycol*) 400, 252 g adipic acid and 10 g benzoic acid were introduced into a 2-liter three-necked flask equipped with an internal thermometer, stirrer and distillation bridge and, after an inert atmosphere had been established with nitrogen, were immediately heated to 160° C. and then, over a period of another 2 hours, to 200° C. This temperature was maintained for 2 hours and was then increased to 250° C. over a period of another 5 hours, followed by stirring for 8 hours at that temperature until the desired acid value was reached. The product was poured into an aluminium pan, chopped up after cooling and extracted with water at room temperature.

*) Polyoxyalkylenediols or polyalkylene oxide diols (sometimes also referred to, for example, as polyalkylene glycols) are for example prepared by reaction of alkylene oxides (such as ethylene oxide or propylene oxide) with bifunctional starters (water or diols) by well-known methods.

The analytic data of the product are shown in Table 1.

EXAMPLES 1 to 5 (invention)

Polyetheramides were prepared as described in Comparison Example 1 using various long-chain amines and carboxylic acids instead of benzoic acid for chain regulation. The analytical data of all the polyetheramides are shown in Table 1.

TABLE 1

| Example | Chain terminator (mol-%) | Mp. | AV (acid value) | $n_{rel}$ |
|---|---|---|---|---|
| Comp. 1 | 0.71 Benzoic acid | 160 | 6 | 1.6 |
| 1 | 0.74 Stearylamine | 150 | 6.7 | 1.55 |
| 2[1] | 0.74 Stearylamine | 140 | 5.6 | 1.5 |
| 3 | 0.73 Behenylamine[2] | 145–150 | 9.0 | 1.6 |
| 4[3] | 0.70 Stearic acid | 140–145 | 12.0 | 1.4 |
| 5[4] | 2.88 Stearylamine | 150 | 6.7 | 1.45 |

[1]Product not extracted
[2]Jafamin P-Hal 20/22; Jahres Fabriker A.S., Norway
[3]Quantity of adipic acid reduced to 248 g
[4]Quantity of 4,4'-diaminodicyclohexyl methane reduced to 210 g.

Adhesive properties

Tensile strength, tensile shear strength, setting behaviour and melt viscosity are shown as adhesive properties in Table 2.

Test Methods

1. Melt viscosity

An indirectly heated test tube approximately 30 mm in diameter is approximately three-quarters filled with the test material. The viscosity of the melt is measured with a Brookfield RVT viscosimeter, spindle 7, at 10 r.p.m. and at intervals of 10° C. starting from the initial temperature.

2. Tensile strength

To determine tensile strength, S-2 test specimens are made from the test material and tested in accordance with DIN 53 504. Average values in N/mm² are determined from 6 test specimens in each test.

3. Setting behavior

This test is carried out on the Nora test rubber Duranit, Shore hardness 92, of Freudenberg AG. The material is roughened in the longitudinal direction with 40-grain abrasive tape. A drop of the hotmelt is applied to the end of the test specimen, the free end of the test rubber is immediately pressed by hand onto the adhesive-containing side and firmly held. The time after which the adhesive had compensated the resilience of the rubber, so that the bond no longer separated, was measured in several tests.

4. Tensile shear strength

2 Test specimens of Nora rubber (80×20×3 mm) are bonded together with test material applied hot with a 10 mm overlap. Immediately afterwards, 5 test specimens are subjected for 10 minutes to weights of 500 to 2500 g. The bond is evaluated for success or failure.

TABLE 2

| Example | Tensile strength (MPa) | Tensile shear strength (room temperature) | Setting behavior (sec.) | MV in (Pa.s) at 190 | 200 | 210 | 220° C. |
|---|---|---|---|---|---|---|---|
| Comp. 1 | 8.6 | 1 | 10 | >160 | 125 | 76 | 35 |
| 1 | 10.7 | 1 | 5 | — | 34 | 32 | 12 |
| 2² | 8.1 | 1 | 10 | 20 | 10 | 9 | 9 |
| 3 | 9.3 | 1 | 5 | — | 10 | 10 | 10 |
| 4 | 10.4 | 1 | 5 | — | 18 | 18 | 12 |
| 5 | 10.7 | 1 | 5 | 14 | 10 | 6 | 4 |

¹Holds firm for more than 10' up to 2500 g
²Not extracted
MV = melt viscosity at the temperature shown The Examples show that melt viscosity can be distinctly reduced for the same or even improved adhesive properties by the chain terminators to be used in accordance with the invention. Even a non-extracted product (Example 2) modified in accordance with the invention shows substantially the same values. The Pas modified in accordance with the invention are therefore a valuable addition to the state of the art.

We claim:

1. Polyetheramide hotmelt adhesives having acid values in the range from 4 to 20, relative viscosities (1% by weight solutions in m-cresol at 25° C.) in the range from 1.3 to 2.5, softening points in the range from 100° to 200° C. and melt viscosities in the range from 100° to 190° C. at 200° C. wherein the polyetheramide hot melt adhesives are prepared from the reaction of (1) 40 to 75% by weight of polyamide-forming components comprising caprolactam, ε-amino-caproic acid or a mixture thereof, (2) 25 to 60% per weight of a mixture of components (a) to (c) in the stated equivalent ratios of (a) 0.95 to 1.05 equivalents comprising one or more compounds selected from the group of aliphatic and aromatic $C_4$–$C_{34}$ dicarboxylic acids, (b) 0.2 to 0.9 equivalents comprising one or more compounds selected from the group of aliphatic and cycloaliphatic $C_6$–$C_{25}$-diamines (c) 0.1 to 0.8 equivalents of one or more polyoxyalkylene diols having molecular weights (Mn) in the range from 200 to 1000 g mol⁻¹, wherein the terminal groups are OH groups, terminal primary amine groups or a mixture thereof, where the sum of equivalents (b+c)=1, and (3) 0 to 15% by weight of a lactam and aminocarboxylic acids different from caprolactam and aminocaproic acid wherein chain terminators corresponding to general formula (1)

$$R-Y \qquad (1)$$

in which

R is an optionally branched, saturated or unsaturated, optionally substituted alkyl radical having a length of 12 to 40 C atoms, and Y is one of the groups $$-NH_2 \qquad (II)$$

$$-COOH \qquad (III)$$

are present in the reaction mixture during the synthesis in quantities of 0.1 to 4.0 mol-% in addition to the amount of the other polyamide-forming components.

2. Polyetheramide hotmelt adhesives according to claim 1, characterized in that the alkyl groups R of formula (I) have 16 to 35 C atoms.

3. Polyetheramide hotmelt adhesives according to claim 1, characterized in that the chain terminators R—Y are stearic acid, stearylamine, behenic acid, behenylamine, hexadecylamine or hexadecanoic acid.

4. Polyetheramide hotmelt adhesives according to claim 1, characterized in that from 0.2 to 3.0 mol% of chain terminators of formula (I) are present in the reaction mixture.

5. Polyetheramide hotmelt adhesives according to claim 1, characterized in that the dicarboxylic acids (2a) are adipic acid, isophthalic acid, terephthalic acid or sebacic acid, the diamines (2b) are hexamethylenediamine, trimethyl hexamethylenediamines, isophoroediamine or binuclear diamines corresponding to formula (V)

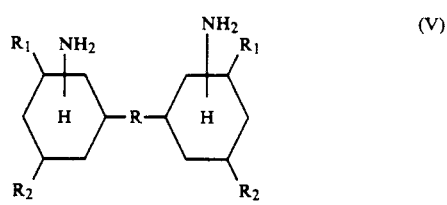

(V)

in which R is an alkylene or alkylidene radical containing 1 to 10 C atoms and $R_1$ and $R_2$ are the same or different and represent H or $C_{1-3}$ alkyl, the polyoxyalkylenediols (2c) are polyoxyethylenediols, polyoxypropylenediols or ethyleneoxide/propyleneoxide copolymer diols, and component (3) is laurin lactam or aminoundecanoic acid.

6. Polyetheramide hotmelt adhesives according to claim 5 wherein R is a —CH$_2$-group or a $$-\underset{\underset{CH_3}{|}}{\overset{\overset{CH_3}{|}}{C}}-$$

group.

7. Polyetheramide hotmelt adhesives according to claim 5 wherein the diamine (2b) is 4,4'-diamino-3,3'-dimethyl dicyclohexyl methane, 4,4'-diamino-3,3',5,5'-tetramethyl dicyclohexyl methane, 4,4'-diaminodicyclohexyl propane, 4,4'-diaminodicyclohexyl methane or diaminodicyclohexyl methane isomer mixtures of which at least 75% consist of the 4,4'-isomer.

8. Polyetheramide hotmelt adhesives according to claim 1, characterized in that 0.2 to 3.5 mol% of monoamines and monocarboxylic acids R—Y with an alkyl group R with 16 to 35 C atoms in the chain are present in the reaction mixture as chain terminators during the synthesis, together with
  (1) 40–75% by weight caprolactam, aminocaproic acid or a mixture thereof,
  (2) 25–60% of a mixture of (a) to (c) in the stated equivalent ratios of
    (a) one equivalent of at least one dicarboxylic acid, selected from adipic acid, sebacic acid, isophthalic acid and terephthalic acid,
    (b) 0.5 to 0.9 equivalents of at least one compound selected from hexamethylene diamine and 4,4-diaminodicyclohexyldiamine and its isomer mixtures and
    (c) 0.1 to 0.5 equivalents of polyalkylenediols having a molecular weight (Mn) in the range from 300 to 600 g.mol$_{-1}$,
and where the sum of the equivalents (b+c)=1.

9. Polyetheramide hotmelt adhesives according to claim 8 wherein component (2b) comprises up to 10% by weight of triamines.

10. Polyetheramide hotmelt adhesives according to claim 1 wherein the dicarboxylic acids (2a) comprise at most 15% by weight dimer fatty acids containing at least 95% by weight dimeric fatty acids.

11. Polyetheramide hotmelt adhesives according to claim 1 further comprising pigments, flatting agents, nucleating additives, stabilizers, elastomer modifiers and flow aids that are added before, during or after the polycondensation.

12. A process for the production of the polyetheramide hotmelt adhesives of claim 1 comprising reacting
  (1) 40 to 75% by weight of polyamide-forming components comprising caprolactam, ε-amino-caproic acid or a mixture thereof,
  (2) 25 to 60% per weight of a mixture of components
    (a) to (c) in the stated equivalent ratios of
    (a) 0.95 to 1.05 equivalents comprising one or more compounds selected from the group of aliphatic and aromatic C$_4$-C$_{34}$ dicarboxylic acids,
    (b) 0.2 to 0.9 equivalents comprising one or more compounds selected from the group of aliphatic and cycloaliphatic C$_6$-C$_{25}$-diamines
    (c) 0.1 to 0.8 equivalents of one or more polyoxyalkylene diols having molecular weights (Mn) in the range from 200 to 1000 g mol$^{-1}$, wherein the terminal groups are OH groups, terminal primary amine groups or a mixture thereof,
where the sum of equivalents (b+c)=1, and
  (3) 0 to 15% by weight of a lactam and aminocarboxylic acids different from caprolactam and aminocaproic acid
in the presence of chain terminators corresponding to general formula (1)

R—Y           (1)

in which
R is an optionally branched, saturated or unsaturated, optionally substituted alkyl radical having a length of 12 to 40 C atoms, and
Y is one of the groups

—NH$_2$           (II)

—COOH           (III)

in quantities of 0.1 to 4.0 mol-% in addition to the amount of the other polyamide-forming components.

13. A process for the production of polyetheramide hotmelt adhesives according to claim 8 comprising reacting
  (1) 40–75% by weight caprolactam, aminocaproic acid or a mixture thereof,
  (2) 25–60% of a mixture of (a) to (c) in the stated equivalent ratios of
    (a) one equivalent of at least one dicarboxylic acid, selected from adipic acid, sebacic acid, isophthalic acid and terephthalic acid,
    (b) 0.5 to 0.9 equivalents of at least one compound selected from hexamethylene diamine and 4,4-diaminodicyclohexyldiamine and its isomer mixtures and
    (c) 0.1 to 0.5 equivalents of polyalkylenediols having a molecular weight (Mn) in the range from 300 to 600 g.mol$_{-1}$,
where the sum of the equivalents (b+c)=1 wherein the reaction takes place in the presence of 0.2 to 3.5 mol% of monoamines or monocarboxylic acids R—Y wherein R is an alkyl group having 16 to 35 C atoms.

14. Thermoplastic materials comprising polyetheramide prepared from the reaction of
  (1) 40 to 75% by weight of polyamide-forming components comprising caprolactam, γ-amino-caproic acid or a mixture thereof,
  (2) 25 to 60% per weight of a mixture of components
    (a) to (c) in the stated equivalent ratios of
    (a) 0.95 to 1.05 equivalents comprising one or more compounds selected from the group of aliphatic and aromatic C$_4$-C$_{34}$ dicarboxylic acids,
    (b) 0.2 to 0.9 equivalents comprising one or more compounds selected from the group of aliphatic and cycloaliphatic C$_6$-C$_{25}$-diamines
    (c) 0.1 to 0.8 equivalents of one or more polyoxyalkylene diols having molecular weights (Mn) in the range from 200 to 1000 g mol$^{-1}$, wherein the terminal groups are OH groups, terminal primary amine groups or a mixture thereof,
where the sum of equivalents (b+c)=1, and
  (3) 0 to 15% by weight of a lactam and aminocarboxylic acids different from caprolactam and aminocaproic acid wherein chain terminators corresponding to general formula (1)

$$R-Y \quad (1)$$

in which
R is an optionally branched, saturated or unsaturated, optionally substituted alkyl radical having a length of 12 to 40 C atoms, and Y is one of the groups $$-NH_2 \quad (II)$$

$$-COOH \quad (III)$$

are present in the reaction mixture during the synthesis in quantities of 0.1 to 4.0 mol-% in addition to the amount of the other polyamide-forming components.

* * * * *